United States Patent
Haskell et al.

(10) Patent No.: US 8,031,777 B2
(45) Date of Patent: Oct. 4, 2011

(54) MULTIPASS VIDEO ENCODING AND RATE CONTROL USING SUBSAMPLING OF FRAMES

(75) Inventors: Barin Haskell, Mountain View, CA (US); Adriana Dumitras, Sunnyvale, CA (US); Hsi-Jung Wu, San Jose, CA (US); Xin Tong, Mountain View, CA (US); Thomas Pun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1597 days.

(21) Appl. No.: 11/384,379

(22) Filed: Mar. 21, 2006

(65) Prior Publication Data

US 2007/0116126 A1 May 24, 2007

Related U.S. Application Data

(60) Provisional application No. 60/737,803, filed on Nov. 18, 2005.

(51) Int. Cl.
*H04B 1/66* (2006.01)
(52) U.S. Cl. ......... 375/240.21; 375/240.03; 375/240.25; 375/240; 375/240.12
(58) Field of Classification Search .............. 375/240.03, 375/240.12, 240.25, 240, 240.21, 240.26; 348/714, 441
See application file for complete search history.

(56) References Cited

U.S. PATENT DOCUMENTS

| | | | |
|---|---|---|---|
| 3,716,851 A | 2/1973 | Neumann | |
| 4,023,110 A | 5/1977 | Oliver | |
| 4,131,765 A | 12/1978 | Kahn | |
| 4,217,609 A | 8/1980 | Hatori et al. | |
| 4,394,774 A | 7/1983 | Widergren et al. | |
| 4,437,119 A | 3/1984 | Matsumoto et al. | |
| 4,670,851 A | 6/1987 | Murakami et al. | |
| 4,698,672 A | 10/1987 | Chen et al. | |
| 4,760,446 A | 7/1988 | Ninomiya et al. | |
| 4,837,618 A | 6/1989 | Hatori et al. | |
| 4,864,393 A | 9/1989 | Harradine | |
| 4,901,075 A | 2/1990 | Vogel | |
| 5,010,401 A | 4/1991 | Murakami et al. | |
| 5,021,879 A | 6/1991 | Vogel | |
| 5,068,724 A | 11/1991 | Krause et al. | |
| 5,091,782 A | 2/1992 | Krause et al. | |
| 5,093,720 A | 3/1992 | Krause et al. | |
| 5,113,255 A | 5/1992 | Nagata et al. | |
| 5,168,375 A | 12/1992 | Reisch et al. | |
| 5,175,618 A | 12/1992 | Ueda et al. | |

(Continued)

OTHER PUBLICATIONS

Puri & Chen, editors, Multimedia Systems, Standards, and Networks, Chapter 3, pp. 55-64, Marcel Dekker, Inc., New York, 2000.

(Continued)

*Primary Examiner* — Eva Puente
(74) *Attorney, Agent, or Firm* — Kenyon & Kenyon LLP

(57) ABSTRACT

An encoder includes an encoder engine, a storage device and a controller to implement an iterative coding process. The encoder engine compresses a selected portion of a data sequence. The storage device stores the compressed portion of the data sequence after each iteration. The controller selects the portion of the data sequence to compress for each iteration. The controller gathers statistics from the compressed portion of the data sequence. The gathered statistics include statistics generated by the selected frames and statistics extrapolated from the selected frames for the non-selected frames. The controller adjusts coding parameters of the encoder engine on each iteration until the gathered statistics meet a specified performance requirement.

65 Claims, 3 Drawing Sheets

U.S. PATENT DOCUMENTS

| | | | |
|---|---|---|---|
| 5,223,949 A | 6/1993 | Honjo | |
| 5,260,783 A | 11/1993 | Dixit | |
| 5,293,229 A | 3/1994 | Iu | |
| 5,298,991 A | 3/1994 | Yagasaki et al. | |
| 5,317,397 A | 5/1994 | Odaka et al. | |
| 5,329,318 A | 7/1994 | Keith | |
| 5,343,248 A | 8/1994 | Fujinami | |
| 5,377,051 A | 12/1994 | Lane et al. | |
| 5,412,430 A | 5/1995 | Nagata | |
| RE34,965 E | 6/1995 | Sugiyama | |
| 5,428,396 A | 6/1995 | Yagasaki et al. | |
| RE35,093 E | 11/1995 | Wang et al. | |
| 5,469,208 A | 11/1995 | Dea | |
| 5,469,212 A | 11/1995 | Lee | |
| RE35,158 E | 2/1996 | Sugiyama | |
| 5,497,239 A | 3/1996 | Kwon | |
| 5,510,840 A | 4/1996 | Yonemitsu et al. | |
| 5,539,466 A | 7/1996 | Igarashi et al. | |
| 5,543,843 A | 8/1996 | Kato | |
| 5,543,847 A | 8/1996 | Kato | |
| 5,557,330 A | 9/1996 | Astle | |
| 5,559,557 A | 9/1996 | Kato | |
| 5,565,920 A | 10/1996 | Lee et al. | |
| 5,568,200 A | 10/1996 | Pearlstein et al. | |
| 5,587,806 A | 12/1996 | Yamada et al. | |
| 5,596,602 A * | 1/1997 | Couwenhoven et al. | 375/240 |
| 5,625,355 A | 4/1997 | Takeuo et al. | |
| 5,648,733 A | 7/1997 | Worrell et al. | |
| 5,654,706 A | 8/1997 | Jeong | |
| 5,666,461 A | 9/1997 | Igarashi et al. | |
| 5,684,534 A | 11/1997 | Harney et al. | |
| 5,703,646 A | 12/1997 | Oda | |
| 5,711,012 A | 1/1998 | Bottoms et al. | |
| 5,719,986 A | 2/1998 | Kato et al. | |
| 5,831,688 A | 11/1998 | Yamada et al. | |
| 5,841,939 A | 11/1998 | Takahashi et al. | |
| 5,852,664 A | 12/1998 | Iverson et al. | |
| 5,887,111 A | 3/1999 | Takahashi et al. | |
| 5,917,954 A | 6/1999 | Girod et al. | |
| 5,946,043 A | 8/1999 | Lee et al. | |
| 5,949,948 A | 9/1999 | Krause et al. | |
| 5,991,447 A | 11/1999 | Eifrig et al. | |
| 5,991,503 A | 11/1999 | Miyasaka et al. | |
| 6,037,982 A * | 3/2000 | Coelho | 348/393.1 |
| 6,052,507 A | 4/2000 | Niida et al. | |
| 6,064,776 A | 5/2000 | Kikuchi et al. | |
| 6,081,296 A | 6/2000 | Fukunaga et al. | |
| 6,081,551 A | 6/2000 | Etoh | |
| RE36,761 E | 7/2000 | Fujiwara | |
| 6,088,391 A | 7/2000 | Auld et al. | |
| 6,115,070 A | 9/2000 | Song et al. | |
| 6,125,146 A | 9/2000 | Frencken et al. | |
| 6,141,383 A | 10/2000 | Yu | |
| 6,144,698 A | 11/2000 | Poon et al. | |
| 6,167,087 A | 12/2000 | Kato | |
| 6,169,821 B1 | 1/2001 | Fukunaga et al. | |
| 6,188,725 B1 | 2/2001 | Sugiyama | |
| 6,217,234 B1 | 4/2001 | Dewar et al. | |
| 6,256,420 B1 | 7/2001 | Sako et al. | |
| 6,563,549 B1 | 5/2003 | Sethuraman | |
| 7,071,999 B2 * | 7/2006 | Lee | 348/714 |
| 7,343,291 B2 * | 3/2008 | Thumpudi et al. | 704/500 |
| 7,408,984 B2 * | 8/2008 | Lu et al. | 375/240.02 |
| 2002/0191692 A1 * | 12/2002 | Fallon et al. | 375/240 |
| 2003/0013298 A1 * | 1/2003 | May | 438/666 |
| 2005/0058200 A1 * | 3/2005 | Lu et al. | 375/240.12 |
| 2005/0286631 A1 | 12/2005 | Wu et al. | |
| 2006/0013298 A1 | 1/2006 | Tong et al. | |
| 2006/0093041 A1 * | 5/2006 | Cieplinski et al. | 375/240.21 |
| 2006/0245492 A1 * | 11/2006 | Pun et al. | 375/240.03 |
| 2007/0094583 A1 * | 4/2007 | Randall et al. | 715/500.1 |
| 2009/0304077 A1 * | 12/2009 | Wu et al. | 375/240.12 |
| 2010/0027622 A1 * | 2/2010 | Dane et al. | 375/240.12 |

OTHER PUBLICATIONS

"Coding of Moving Pictures and Associated Audio Information", ISO/JEC JTC1/SC29WG11 Video Group, Feb. 1996.

Haskell, Barry G.; Puri, Atul; and Netravali, Arun N.; "Digital Video: An Introduction to MPEG-2", Digital Multimedia Standards Series, pp. 33-54, 80-182, 369-411.

Mitchell, Joan.; Pennebaker, William B.; Fogg, Chad E.; and LeGall, Didier J.; "MPEG Video Compression Standard" Digital Multimedia Standards Series, pp. 17-32 and 81-103, 333-356.

Zhihai He, Y.K. Kim, and S.K. Mitra, "Low-delay rate control for DCT video coding via ρ-domain source modeling," IEEE Trans. on Circuits and Systems for Video Technology, Aug. 2001, vol. 11, No. 8.

Zhihai He and S.K. Mitra, "Optimum bit allocation and accurate rate control for video coding via ρ-domain source modeling," IEEE Trans. on Circuits and Systems for Video Technology, Oct. 2002, pp. 840-849, vol. 12, No. 10.

Zhihai He and S.K. Mitra, "A unified rate-distortion analysis framework for transform coding," IEEE Trans. on Circuits and Systems for Video Technology, Dec. 2001, pp. 1221-1236, vol. 11, No. 12.

J. Ribas-Corbera and S.M. Lei, "A frame-layer bit allocation for H.263+," IEEE Trans. on Circuits and Systems for Video Technology, Oct. 2000, vol. 10, No. 7.

Y. Yu, J. Zhou, Y. Wang, and C.W. Chen, "A novel two-pass VBR algorithm for fixed-size storage application," IEEE Trans. on Circuits and Systems for Video Technology, Mar. 2001, vol. 11, No. 3.

H. Song and C-C J. Kuo, "Rate control for low-bit rate video via variable-encoding frame rates," IEEE Trans. on Circuits and Systems for Video Technology, Apr. 2001, vol. 11, No. 4.

J. Xin, M.-T. Sung, B.-S. Choi, and K.-W. Chun, "An HDTV-to-SDTV spatial transcoder," IEEE Trans. on Circuits and Systems for Video Technology, Nov. 2002, vol. 11, No. 11.

A. Jagmohan and K. Ratakonda, "MPEG-4 one-pass VBR rate control for digital storage," IEEE Trans. on Circuits and Systems for Video Technology, May 2003, vol. 13, No. 5.

L. Wang and A. Vincent, "Bit allocation and constraints for joint coding of multiple video programs," IEEE Trans. on Circuits and Systems for Video Technology, Sep. 2003, vol. 9, No. 6.

* cited by examiner

MULTIPASS VIDEO ENCODING AND RATE CONTROL USING SUBSAMPLING OF FRAMES

CROSS REFERENCE TO RELATED APPLICATIONS

This application claims priority to U.S. Provisional Patent Application No. 60/737,803, filed Nov. 18, 2005, herein incorporated by reference in its entirety.

BACKGROUND OF THE INVENTION

1. Field of the Invention

The present invention generally relates to video encoders. More specifically, the present invention provides multipass encoding of a video sequence without encoding the entire video sequence on each pass.

2. Background Art

Highly efficient video compression can be achieved by multipass encoding. With multipass encoding, a video sequence is encoded several times and each encoding pass uses the results of the preceding pass to adjust coding parameters to optimize, for example, average bit rate and/or decoder buffer fullness. Overall, the mulitpass encoding process is a trial and error process: select initial coding parameters, code the video sequence, examine the results to determine if performance requirements are met and recode as necessary using adjusted coding parameters for each subsequent iteration.

For long sequences of digital video, however, coding the entire video sequence several times is inefficient and greatly increases the time required to generate an efficiently compressed sequence. Accordingly, what is needed is an encoder capable of generating a compressed video sequence by multipass encoding without encoding the entire video sequence on each pass.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION OF THE INVENTION

Embodiments of the present invention provide apparatuses and methods whereby an encoder efficiently generates a highly compressed video sequence using multipass encoding without coding all portions of the video sequence on each pass. In this regard, the present invention enables independent encoders to generate highly compressed video sequences in less time and by using fewer processing resources.

Figure 1:
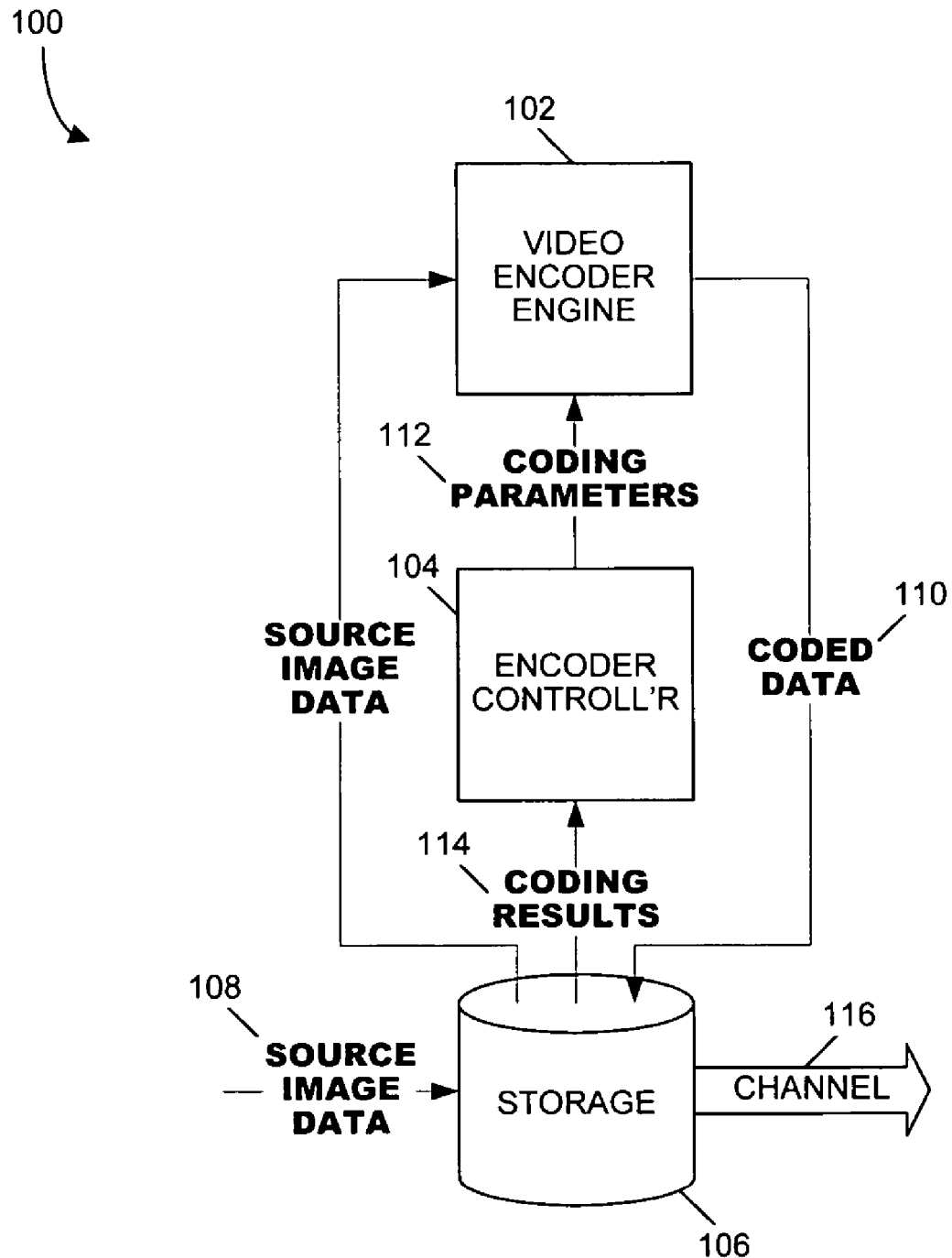
FIG. 1 is a functional block diagram of an encoding system according to an aspect of the present invention.

FIG. 1 is a functional block diagram of an encoding system 100 according to an aspect of the present invention. The encoding system 100 includes a video encoder engine 102, an encoder controller 104 and a memory/storage device 106. The storage device 106 receives and stores source image data 108. The source image data 108 is an uncompressed video sequence that can include frame type assignment information. The storage device 106 provides the source image data 108 to the encoder engine 102. The encoder engine 102 encodes the source image data 108 to produce coded data 110. The coded data 110 is a compressed video data sequence. The encoder engine 102 encodes the source image data 108 based on coding parameters 112 provided by the controller 104.

During intermediate encoding passes or iterations, the coded data 110 can be stored in the storage device 106. The controller 104 can review the coded data 110 to determine coding results 114 of the encoding process. Specifically, the controller 104 can determine whether the results of any given encoding stage meet specified coding requirements such as, for example, an estimated decoder buffer fullness level or an average bit rate expectation. After a final encoding pass, when the controller 104 determines that coding requirements are met, the coded data 110 can be provided to a communication channel 116. The communication channel 116 can be a real-time delivery system such as a communication network (e.g., a wireless communication network) or a computer network (e.g., the Internet). Alternatively, the communication channel 116 can be a storage medium (e.g., an electrical, optical or magnetic storage device) that can be physically distributed. Overall, the topology, architecture and protocol governing operation of the communication channel 116 is immaterial to the present discussion unless identified herein.

The controller 104 can determine what portion of the source image data 108 will be encoded on any given encoding pass. The selected frames can then be encoded on a first pass and any intermediate passes. The controller "subsamples" the source image data 108 when less than the entire sequence is selected for encoding. That is, during subsampling, the controller 104 directs the encoder engine 102 to only encode select frames from the video sequence rather than the entire sequence. The controller 104 uses the coding results 114 of the selected encoded frames to extrapolate information regarding the non-selected frames. Coding parameters can therefore be adjusted as necessary for a subsequent encoding pass based on the coding results of the selected frames and the extrapolated results of the non-selected frames. Further, the number, type and position of the frames selected for encoding can also be adjusted on each pass. When the coding results 114 of the coded data 110 meet specified requirements, the controller 104 can instruct the encoder engine 102 to encode the source image data 108 a final time to produce a complete coded data sequence 110.

A variety of techniques, as described further below, can be used by the controller 104 to selectively subsample the source image data 108 and to extrapolate statistics for the non-selected frames based on selected encoded frames. Further, these techniques can be expanded to accommodate layered encoding. Overall, the encoding system 100 provides the efficient generation of a highly compressed coded data sequence 110 using multipass encoding. By not requiring the encoding of all portions of the source image data 108 on each coding pass, the encoding system 100 reduces the time needed to simulate the coded data 110 and confirm that coding requirements are met. In turn, a complete coded data sequence can be generated more quickly while ensuring the complete coded data sequence is highly compressed.

The encoding system 100 can be used to encode a variety of information including data, voice, audio, video and/or multimedia information according to known compression standards or protocols. In an embodiment of the present invention, the encoder engine 102 can implement digital video encoding protocols such as, for example, any one of the Moving Picture Experts Group (MPEG) standards (e.g., MPEG-1, MPEG-2, or MPEG-4) and/or the International Telecommunication Union (ITU) H.264 standard. Additionally, the constituent components of the encoding system 100 can be implemented in hardware, software or any combination thereof.

Further, coding adjustments made by the controller 104 and implemented by the encoder engine 102 can include a variety of techniques for adjusting bit rate. For example, a quantization parameter (qp) can be used whereby qp is increased to lower bit rate and is decreased to increase bit rate. The quantization parameter can also be based on a masking function $\phi_r$. The masking function $\phi_r$ can be used to define areas of high and low activity of a video picture. Regions of higher activity typically require a higher bit rate while regions defined as low activity may require a lower bit rate, thereby determining a corresponding encoding bit rate. Coding adjustments based on qp or $\phi_r$ can be made within a given frame, across several frames or across several clips as described in co-pending application Ser. No. 11/118,616, filed Apr. 28, 2005, herein incorporated by reference in its entirety.

Figure 2:
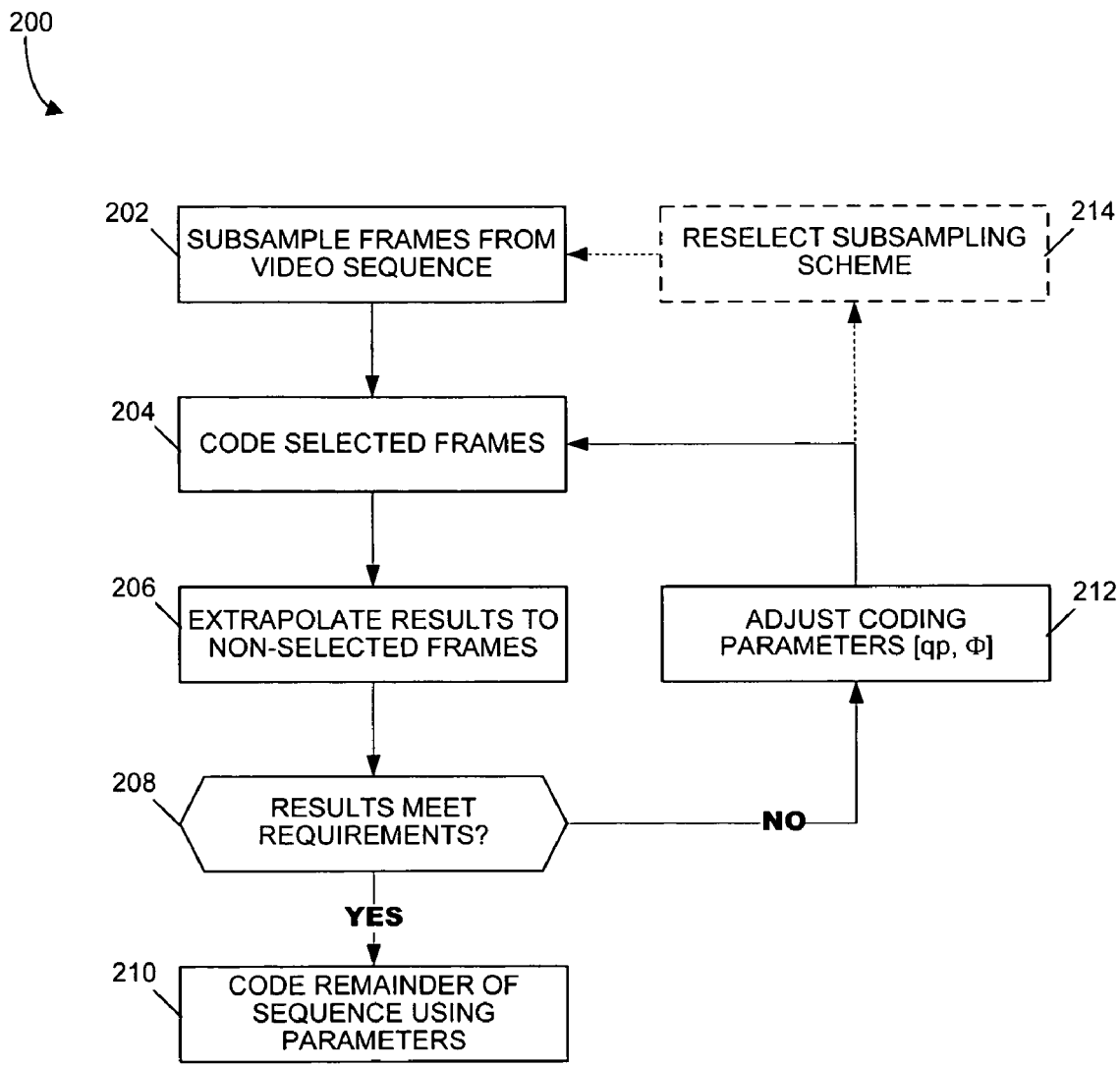
FIG. 2 provides a flowchart illustrating operational steps for implementing a subsampling multipass encoding scheme according to an aspect of the present invention.

FIG. 2 provides a flowchart 200 illustrating operational steps for implementing a subsampling multipass encoding scheme according to an aspect of the present invention. Specifically, FIG. 2 provides a description of the possible operation of an encoding system of the present invention (e.g., the encoding system 100 depicted in FIG. 1).

The flowchart 200 begins with an initialization step (not depicted in FIG. 2 as a separate step). In the initialization step, source image data can be provided. Frame type selections (e.g., I vs. P vs. B, or reference vs. non-reference) can be provided with the source image data. Further, default coding selections can be available (e.g., default qp and/or $\phi_r$ determinations).

At step 202, one of the subsampling schemes, to be described further below, can be chosen and a portion of the provided source image data can be selected for encoding. On the first pass, either a limited portion of the frames or all the frames can be selected. On intermediate passes, the frames may be subsampled as desired. For example, more frames or less frames can be selected for coding on a next pass. On a final pass, all of the frames can be selected and encoded to produce a fully encoded video sequence.

At step 204, the selected frames of a particular pass can be encoded. The selected frames can be encoded according to selected encoding parameters (e.g., qp). Statistics (e.g., resulting bit rate and/or estimated decoder buffer fullness) relating to the encoding of the selected frames can also be generated and collected.

At step 206, statistics (e.g., resulting bit rate and/or estimated decoder buffer fullness) for the frames not selected for encoding in step 202 can be determined. The statistics can be extrapolated from the statistics generated in step 204 for the selected frames. Extrapolation can be based on various parameters such as, for example, the number, type, location and dependence of the non-selected frames in relation to the selected frames as described in more detail below.

At step 208, overall results can be determined and evaluated. Overall results can be determined based on the generated statistics of the selected frames and the extrapolated statistics of the non-selected frames. These combined results can then be compared to specified coding requirements (e.g., average bit rate or estimate buffer fullness for a completely coded sequence).

Step 210 can be implemented or executed when the specified coding requirements are met or expected to be met for an entire coded sequence. The coding parameters used for coding the selected frames can be applied to the non-selected frames. Alternatively, the coding parameters can be adjusted prior to encoding the omitted frames. The non-selected frames can then be encoded and combined with the previously encoded frames to produce a complete encoded sequence. Alternatively, the entire uncompressed video sequence can be re-encoded.

Step 212 can be implemented or executed when the specified coding requirements are not met or expected to be met for an entire coded sequence. Accordingly, a subsequent encoding pass can be implemented. Coding parameters (e.g., qp and/or $\phi_r$ can be adjusted before returning to step 204 for another round of coding and evaluation. Alternatively, the process can proceed to an optional step 214 to select a new subsampling scheme for further passes to conserve processing resources at the encoder.

Various subsampling schemes and corresponding extrapolation techniques of the present invention are described below.

In an embodiment of the present invention, the frames of a given video sequence may be subsampled on a first pass and all intermediate passes. The selected frames can be coded and corresponding statistics can be generated. Statistics (e.g., bit rate) for the non-selected frames may be extrapolated based on the statistics assembled for the selected and coded frames. Parameters of interest (e.g., average bit rate, buffer fullness, etc.) can be calculated based on the generated and extrapolated statistics. On the last pass, all the frames can be selected and encoded. Subsampling can be implemented according to a variety of techniques including, for example (a) coding all reference frames and omitting all non-reference frames; (b) coding all reference frames and one non-reference frame located between selected reference frames; or (c) coding a portion of the reference frames and, optionally, a single non-reference frame after each selected reference frame thereafter (such that a portion of the reference frames and the non-reference frames dependent thereon can be omitted).

In another embodiment of the present invention, the frames of a given video sequence may be subsampled on a first pass and all intermediate passes. The selected frames can be coded and corresponding statistics can be generated. Statistics (e.g., bit rate) for the non-selected frames can be extrapolated based on the statistics assembled for the selected and coded frames. Parameters of interest (e.g., average bit rate, buffer fullness, etc.) can be calculated based on the generated and extrapolated statistics. On the last pass, all the frames can be selected and encoded. Subsampling can be implemented on a Group of Pictures (GOP) basis. That is, for each GOP, the initial frame (e.g., an I-frame) can be coded along with only select B-frames. The selected B-frames can include, for example, the non-stored B-frames with a GOP. Statistics for the omitted B-frames can be extrapolated from the statistics generated from the coded B-frames. For example, the statistics of the remaining B-frames can be set equal to the average value of the statistics for the selected B-frames. Under this scenario, it is possible for some B-frames to not be encoded until the final pass.

In another embodiment of the present invention, all the frames of a given video sequence can be encoded on a first pass. Statistics for each of the coded frames can be stored for use on subsequent coding stages. Within the encoded video sequence, regions of homogeneity can be identified from the statistics gathered in the first round of coding. Regions of homogeneity can include, for example, regions where the bit rate is relatively constant or has a linear relationship among sub-regions. On subsequent passes, only select frames are encoded within each region of homogeneity and statistics for the non-selected frames within a region can be extrapolated. Within each region, only a few B-frames or even only one B-frame can be selected for coding during the intermediate stages. As a result, uncoded B-frames within a region can be assigned the average statistics of the coded B-frame(s).

Figure 3:
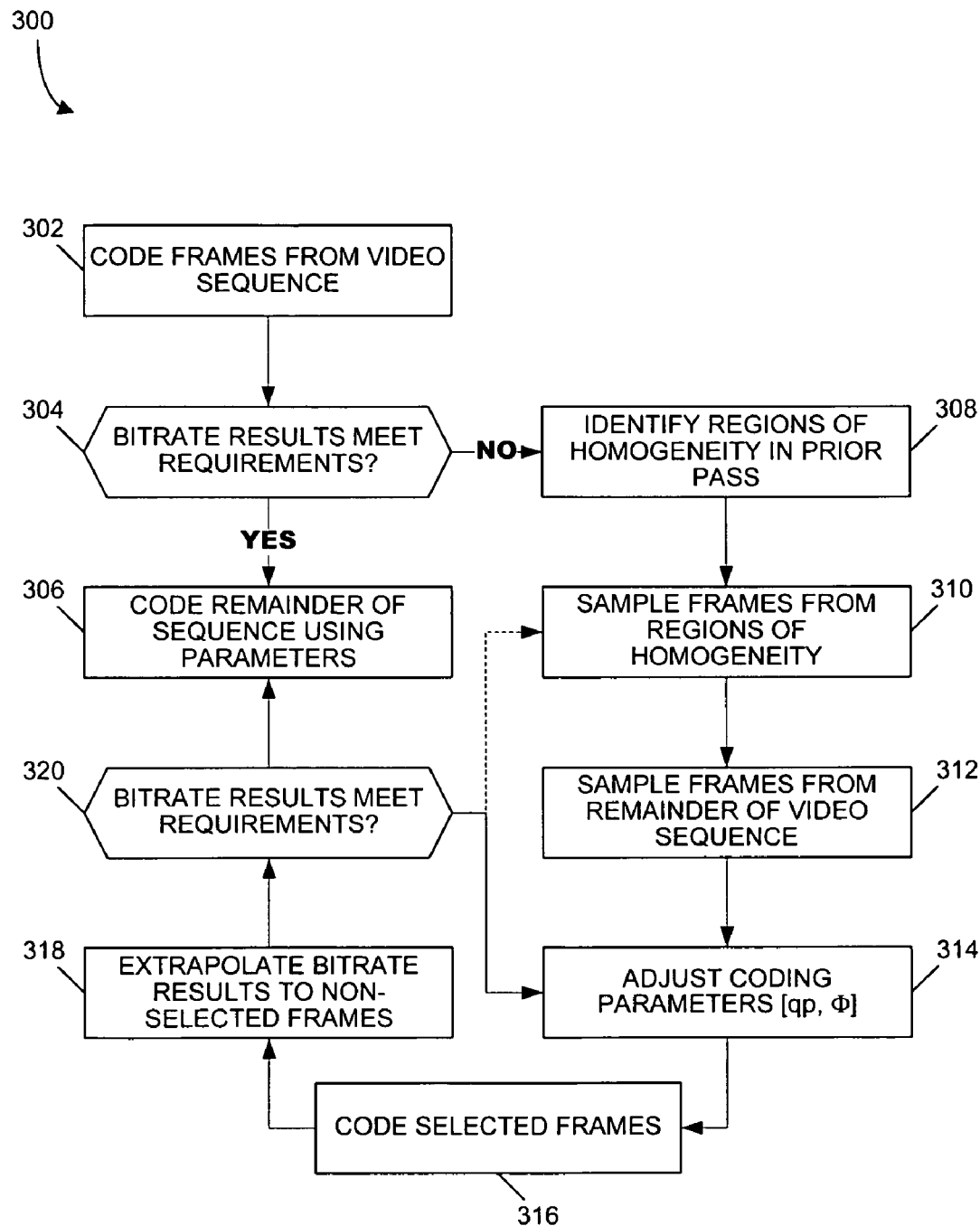
FIG. 3 illustrates a flowchart illustrating operational steps for implementing a subsampling multipass encoding scheme exploiting regions of homogeneity according to an aspect of the present invention.

FIG. 3 illustrates a flowchart 300 illustrating operational steps for implementing a subsampling multipass encoding scheme exploiting regions of homogeneity according to an aspect of the present invention. The present invention is not limited to this operational description. Rather, it will be apparent to persons skilled in the relevant art(s) from the teachings herein that other process control flows are within the scope and spirit of the present invention. In the following discussion, the steps in FIG. 3 are described.

At step 302, all of the frames of a video sequence can be encoded. The frames can be encoded using default coding parameters. Statistics from this encoded step can be kept or stored for later use.

At step 304, parameters such as bit rate and buffer fullness can be examined. If these parameters meet specified requirements, then step 306 may be executed. If all frames are selected in step 302, then step 306 may not need to be implemented. Step 306 may be implemented, however, if it is determined that other portions of the video sequence can be encoded using the coding parameters applied to the frames coded in step 302.

If the parameters evaluated in step 304 do not meet specified requirements, then step 308 can be implemented. At step 308, regions of homogeneity within the encoded frames can be identified.

At step 310, a portion of the frames within a given region of homogeneity can be selected for encoding on a subsequent pass. For example, a single B-frame within a region of homogeneity can be selected.

At step 312, the remainder of the video sequence can be reviewed and frames can be selected for re-coding within each region of homogeneity.

At step 314, coding parameters (e.g., qp and/or $\phi_r$) can be adjusted in response to the coding results collected and examined in step 304.

At step 316, the selected frames within the identified regions of homogeneity can be encoded. Statistics for the coded frames can then be generated.

At step 318, statistics for the non-selected frames within each region of homogeneity can be derived from the statistics generated for the selected frames. Based on the generated and extrapolated statistics, overall coding results for each region of homogeneity and the entire video sequence can be determined.

At step 320, the coding results of each region of homogeneity and the entire video sequence can be compared to specified requirements. If the requirements are met or satisfied, then step 306 can be implemented such that the remaining uncoded frames can be re-encoded (or all frames re-encoded) a final time. If the requirements are not met, then either step 310 or step 314 can be implemented. Step 314 can be implemented if the same selected frames within each region of homogeneity are to be re-encoded on a subsequent pass. Step 310 can be implemented if some or all of the selected frames within the regions of homogeneity are to be adjusted or re-selected. It is also possible to use the statistics stored from step 302 along with the results derived in step 318 to review and re-identify the regions of homogeneity within the coded video sequence. In this way, the estimated regions of homogeneity can be further refined.

In another embodiment of the present invention, the frames of a given video sequence can be subsampled on a first pass and all intermediate passes. The selected frames can be coded and corresponding statistics can be generated. Statistics (e.g., bit rate) for the non-selected frames can be extrapolated based on the statistics assembled for the selected and coded frames. Parameters of interest (e.g., average bit rate, buffer fullness, etc.) can be calculated based on the generated and extrapolated statistics. On the last pass, all the frames can be selected and encoded. Subsampling can be implemented on a Group of Pictures (GOP) basis. That is, for each GOP, the initial frame (e.g., an I-frame) can be coded along with select P-frames and, optionally, select B-frames. Statistics for omitted B-frames (e.g., non-stored B-frames that depend on non-selected P-frames) can be extrapolated from the statistics generated from coded B-frames. Likewise, statistics for omitted P-frames can be extrapolated from the statistics generated from coded P-frames. For example, the statistics of the remaining B-frames and P-frames can be set equal to the average value of the statistics for the selected B-frames and P-frames, respectively.

In another embodiment of the present invention, all the frames of a given video sequence can be encoded on a first pass. Statistics for each of the coded frames can be stored for use on subsequent coding stages. Within the encoded video sequence, regions of homogeneity can be identified from the statistics gathered in the first round of coding. Regions of homogeneity can include, for example, regions where the bit rate is relatively constant or has a linear relationship among sub-regions. On subsequent passes, only select frames are encoded within each region of homogeneity and statistics for the non-selected frames within a region can be extrapolated. Within each region, only a few P-frames or even only one P-frame is selected for coding during the intermediate stages. Accordingly, uncoded P-frames within a region can be assigned the average statistics of the coded P-frame(s). Further, select B frames within each region of homogeneity can be encoded (e.g., B-frames that depend on the selected P-frame(s)). Statistics can then be extrapolated for the remaining B-frames based on the coded frames.

In another embodiment of the present invention, none of the frames of a given video sequence are encoded on a first pass. Instead, the frames are surveyed to gather and store statistics on the frames. On subsequent passes, the stored statistics can be used to determine regions of homogeneity. Within each identified region of homogeneity, a select portion of the frames can be encoded. Statistics for the unencoded frames within each region of homogeneity can be derived from statistics generated from the coded frames.

In another embodiment of the present invention, any of the encoding methods described above can be applied to a layered encoding scenario. In a layered encoding scenario, an encoder of the present invention produces a base layer and one or more enhancement layers. The base layer can be decoded independently and typically produces a picture of medium quality when decoded. An enhancement layer typically cannot be decoded independently but instead is dependent upon a specified base layer. The enhancement layer typically includes information that enhances or improves the quality of the picture provided by the base layer or the base layer and any previously applied enhancement layers. Accordingly, in an aspect of the present invention, any layer can use any of the subsampling encoding methods described herein.

In another embodiment of the present invention, two layers can be defined for each video sequence. A first layer includes a portion of the frames in the video sequence (e.g., all of the reference frames in the video sequence). A second layer includes all of the frames in the video sequence. In a first stage of coding, the first layer can be encoded over multiple passes until the estimated bit rate of the first layer falls within a first specified tolerance level of a target bit rate. The first specified tolerance level represents the confidence an encoder of the present invention has in the estimated bit rate. This confidence can depend upon several factor including, for example, the number or percentage of skipped macroblocks or region of pixels, the number or percent of intra macroblocks or region of pixels, the uniformity of bit rate change over a window of frames, etc. The bit rate can be estimated on each encoding pass of the first layer by executing a low complexity encoding of the first layer frames (e.g., using the subsampling techniques described herein) and determining the resulting bit rate.

In a second stage of coding, the second layer can be encoded over multiple passes until the estimated bit rate of the second layer falls within a second specified tolerance level of the target bit rate. The bit rate can be estimated on each encoding pass of the second layer by executing a low complexity encoding of the second layer frames (e.g., using the subsampling techniques described herein) and determining the resulting bit rate. The resulting bit rate can be adjusted by a scale factor derived from the statistics gathered during the last stage of encoding for the first layer. For example, an encoder of the present invention may store the ratio of frame bits between the reference frames and the non-reference frames after the last stage of coding the first layer. The encoder can then assume that this ratio is fixed for operations involving the coding of the second layer.

In another embodiment of the present invention, an encoder of the present invention defines a layer for each pass as a function of its confidence in an estimated bit rate. A layer can be defined to include all frames within a video sequence if the encoder of the present invention has no prior knowledge of the sequence. As knowledge is gathered from a layer on each coding pass, or if prior information on a sequence is known, then the layer is redefined by adaptively removing frames from the previous layer. Prior knowledge may include motion compensated sum of absolute difference values, masking values, previous bit rate estimates, location variations in estimated bit rate, etc. Frames can be removed based on a confidence measure derived from the prior or accumulated knowledge which can include a measure of the homogeneity of a local neighborhood of frames. Frames within a local neighborhood of frames can be selectively removed based on an assigned reference count of a frame. Specifically, frames can be assigned a reference count specifying the number of frames that depend on the given frame. Accordingly, frames with lower count reference frames can be removed prior to higher count reference frames. Selectively removing frames as described can be applied to any of the methods described above.

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method of coding a video sequence according to an iterative coding process, comprising:
   subsampling frames from the video sequence on a first iteration and any intermediate iterations of the coding process;
   coding the subsampled frames according to adjustable coding parameters;
   generating statistics for the video sequence based on statistics generated by the coding for frames included therein and based on extrapolated statistics for frames excluded from the coding;
   if the statistics of the video sequence do not meet a specified requirement, modifying the adjustable coding parameters for a next iteration of the coding process; and
   coding the non-subsampled frames on a last iteration of the coding process to produce a complete coded video sequence.

2. The method of claim 1, wherein subsampling comprises excluding all non-reference frames within the video sequence.

3. The method of claim 1, wherein subsampling comprises excluding all non-reference frames except at least one non-reference frame between each included reference frame.

4. The method of claim 1, wherein subsampling comprises excluding all non-reference frames and a portion of all reference frames within the video sequence.

5. The method of claim 1, wherein subsampling comprises excluding a portion of all reference frames and all non-reference frames except at least one non-reference frame between each selected reference frame within the video sequence.

6. The method of claim 1, wherein subsampling comprises excluding all frames of the video sequence except a portion of frames within each Group of Pictures (GOP).

7. The method of claim 6, wherein the selected portion of frames with each GOP comprises an initial frame within each GOP only.

8. The method of claim 6, wherein the selected portion of frames with each GOP comprises an initial frame and one or more B-frames within each GOP only.

9. The method of claim 8, wherein generating comprises extrapolating statistics for non-selected B-frames from statistics generated for the one or more selected B-frames within a corresponding GOP.

10. The method of claim 7, wherein the selected portion of frames with each GOP comprises an initial frame and one or more P-frames within each GOP only.

11. The method of claim 10, wherein generating comprises extrapolating statistics for non-selected B-frames from statistics generated for the one or more selected P-frames within a corresponding GOP.

12. A method of coding a video sequence according to an iterative coding process, comprising:
   coding all frames of the video sequence according to default coding parameters on a first iteration of the coding process;
   identifying regions of homogeneity in the video sequence based on initial statistics generated and stored after the first iteration;
   subsampling frames within each identified region of homogeneity on any intermediate iteration of the coding process;
   coding the subsampled frames according to modified coding parameters;
   generating statistics for the video sequence by extrapolating statistics for non-subsampled frames based on statistics generated for the coded subsampled frames within a corresponding identified region of homogeneity;

if the statistics of the video sequence do not meet a specified requirement, modifying the coding parameters for a next iteration of the coding process; and coding the non-subsampled frames on a last iteration of the coding process to produce a complete coded video sequence.

13. The method of claim 12, further comprising identifying regions of homogeneity within the video sequence on each intermediate iteration.

14. The method of claim 12, wherein subsampling frames comprises excluding all frames except one P-frame within each identified region of homogeneity.

15. The method of claim 14, wherein generating comprises extrapolating statistics for non-selected P-frames from statistics generated for the one selected P-frame within a corresponding identified region of homogeneity.

16. The method of claim 12, wherein subsampling frames comprises excluding all frames except one P-frames within each identified region of homogeneity and one or more B-frames that depend from the one selected P-frame within a corresponding identified region of homogeneity.

17. The method of claim 16, wherein generating comprises extrapolating statistics for non-selected B-frames from statistics generated for the one or more selected B-frames within the corresponding identified region of homogeneity.

18. A method of coding a video sequence according to an iterative coding process, comprising:
surveying all frames of the video sequence to gather and store initial statistics on the video sequence on a first iteration of the coding process;
identifying regions of homogeneity in the video sequence based on the initial statistics;
subsampling frames within each identified region of homogeneity on any intermediate iterations of the coding process;
coding the subsampled frames according to adjustable coding parameters;
generating statistics for the video sequence by extrapolating statistics for non-subsampled frames based on statistics generated for the coded subsampled frames within a corresponding identified region of homogeneity;
if the statistics for the video sequence do not meet a specified requirement, modifying the coding parameters for a next iteration of the coding process; and
coding the non-subsampled frames on a last iteration of the coding process to produce a complete coded video sequence.

19. The method of claim 18, further comprising identifying regions of homogeneity within the video sequence on each intermediate iteration.

20. A method of coding a video sequence according to a two-stage iterative coding process, comprising:
subsampling frames from the video sequence;
iteratively coding the subsampled frames during a first stage of coding until an estimated bit rate of the video sequence is within a first tolerance range of a target bit rate;
iteratively coding all frames of the video sequence during a second stage of coding until the estimated bit rate of the video sequence is within a second tolerance range of the target bit rate; and
adjusting coding parameters after each iteration of the coding process.

21. The method of claim 20, wherein subsampling comprises selecting all of the reference frames of the video sequence.

22. The method of claim 20, further comprising extrapolating statistics for non-subsampled frames based on statistics generated for coded subsampled frames after each iteration of the first stage of the coding process.

23. The method of claim 20, wherein iteratively coding all frames comprises iteratively coding all frames based on statistics gathered during a last iteration of the first stage of coding.

24. A method of coding a video sequence according to an iterative coding process, comprising:
subsampling frames of the video sequence on a first iteration based on an availability of initial statistics of the video sequence;
coding the subsampled frames according to default coding parameters;
gathering statistics on the video sequence based on the coded subsampled frames;
if the gathered statistics do not meet a specified requirement, modifying the coding parameters for a next iteration of the coding process;
removing a portion of the subsampled frames for the next iteration based on the gathered statistics; and
coding all frames on a last iteration of the coding process to produce a complete coded video sequence.

25. The method of claim 24, wherein subsampling comprises selecting all frames of the video sequence when the initial statistics are not available.

26. The method of claim 24, wherein gathering comprises extrapolating statistics for non-subsampled frames based on statistics generated for the coded subsampled frames.

27. The method of claim 24, wherein removing comprises removing the portion of the subsampled frames based on a local confidence measure of the gathered statistics.

28. The method of claim 27, wherein the local confidence measure is an indication of homogeneity within a neighborhood of frames.

29. The method of claim 24, wherein removing frames comprises removing frames sequentially based on a reference count of each frame.

30. An encoder to implement an iterative coding process, comprising:
an encoder engine to compress a selected portion of a data sequence;
a storage device to store the compressed portion of the data sequence after each iteration; and
a controller to select for each iteration the portion of the data sequence for compression and to gather statistics from the compressed portion of the data sequence, wherein the controller adjusts coding parameters of the encoder engine until the gathered statistics meet a specified requirement, wherein for a final iteration of the coding process, the controller selects a remaining portion of the data sequence for compression to produce a complete coded data sequence.

31. The encoder of claim 30, wherein the data sequence is a video data sequence.

32. The encoder of claim 30, wherein the controller selects less than all of the frames for compression on each intermediate iteration.

33. The encoder of claim 32, wherein the controller selects all of the frames for compression on a first iteration.

34. The encoder of claim 30, wherein the controller generates statistics for the selected portion of the data sequence and extrapolates statistics for a non-selected portion of the data sequence to comprise the gathered statistics.

35. The encoder of claim 30, wherein the controller selects all of the frames for compression on a last iteration.

36. A non-transitory computer-readable medium having stored thereon coded video data created from an iterative coding process comprising:
 subsampling frames from a video sequence on a first iteration and any intermediate iterations of the coding process;
 coding the subsampled frames according to adjustable coding parameters;
 generating statistics for the video sequence based on statistics generated by the coding for frames included therein and based on extrapolated statistics for frames excluded from the coding;
 if the statistics of the video sequence do not meet a specified requirement, modifying the adjustable coding parameters for a next iteration of the coding process; and
 coding the non-subsampled frames on a last iteration of the coding process to produce a complete coded video sequence.

37. A non-transitory computer-readable medium encoded with instructions which, when executed by a computer, perform a method of coding a video sequence according to an iterative coding process, the method comprising:
 subsampling frames from the video sequence on a first iteration and any intermediate iterations of the coding process;
 coding the subsampled frames according to adjustable coding parameters;
 generating statistics for the video sequence based on statistics generated by the coding for frames included therein and based on extrapolated statistics for frames excluded from the coding;
 if the statistics of the video sequence do not meet a specified requirement, modifying the adjustable coding parameters for a next iteration of the coding process; and
 coding the non-subsampled frames on a last iteration of the coding process to produce a complete coded video sequence.

38. The computer-readable medium of claim 37, wherein subsampling comprises excluding all non-reference frames within the video sequence.

39. The computer-readable medium of claim 37, wherein subsampling comprises excluding all non-reference frames except at least one non-reference frame between each included reference frame.

40. The computer-readable medium of claim 37, wherein subsampling comprises excluding all non-reference frames and a portion of all reference frames within the video sequence.

41. The computer-readable medium of claim 37, wherein subsampling comprises excluding a portion of all reference frames and all non-reference frames except at least one non-reference frame between each selected reference frame within the video sequence.

42. The computer-readable medium of claim 37, wherein subsampling comprises excluding all frames of the video sequence except a portion of frames within each Group of Pictures (GOP).

43. The computer-readable medium of claim 42, wherein the selected portion of frames with each GOP comprises an initial frame within each GOP only.

44. The computer-readable medium of claim 42, wherein the selected portion of frames with each GOP comprises an initial frame and one or more B-frames within each GOP only.

45. The computer-readable medium of claim 44, wherein generating comprises extrapolating statistics for non-selected B-frames from statistics generated for the one or more selected B-frames within a corresponding GOP.

46. The computer-readable medium of claim 43, wherein the selected portion of frames with each GOP comprises an initial frame and one or more P-frames within each GOP only.

47. The computer-readable medium of claim 46, wherein generating comprises extrapolating statistics for non-selected B-frames from statistics generated for the one or more selected P-frames within a corresponding GOP.

48. A non-transitory computer-readable medium encoded with instructions which, when executed by a computer, perform a method of coding a video sequence according to an iterative coding process, the method comprising:
 coding all frames of the video sequence according to default coding parameters on a first iteration of the coding process;
 identifying regions of homogeneity in the video sequence based on initial statistics generated and stored after the first iteration;
 subsampling frames within each identified region of homogeneity on any intermediate iteration of the coding process;
 coding the subsampled frames according to modified coding parameters;
 generating statistics for the video sequence by extrapolating statistics for non-subsampled frames based on statistics generated for the coded subsampled frames within a corresponding identified region of homogeneity;
 if the statistics of the video sequence do not meet a specified requirement, modifying the coding parameters for a next iteration of the coding process; and
 coding the non-subsampled frames on a last iteration of the coding process to produce a complete coded video sequence.

49. The computer-readable medium of claim 48, wherein the method further comprises identifying regions of homogeneity within the video sequence on each intermediate iteration.

50. The computer-readable medium of claim 48, wherein subsampling frames comprises excluding all frames except one P-frame within each identified region of homogeneity.

51. The computer-readable medium of claim 50, wherein generating comprises extrapolating statistics for non-selected P-frames from statistics generated for the one selected P-frame within a corresponding identified region of homogeneity.

52. The computer-readable medium of claim 48, wherein subsampling frames comprises excluding all frames except one P-frames within each identified region of homogeneity and one or more B-frames that depend from the one selected P-frame within a corresponding identified region of homogeneity.

53. The computer-readable medium of claim 52, wherein generating comprises extrapolating statistics for non-selected B-frames from statistics generated for the one or more selected B-frames within the corresponding identified region of homogeneity.

54. A non-transitory computer-readable medium encoded with instructions which, when executed by a computer, perform a method of coding a video sequence according to an iterative coding process, the method comprising:
 surveying all frames of the video sequence to gather and store initial statistics on the video sequence on a first iteration of the coding process;
 identifying regions of homogeneity in the video sequence based on the initial statistics;

subsampling frames within each identified region of homogeneity on any intermediate iterations of the coding process;
coding the subsampled frames according to adjustable coding parameters;
generating statistics for the video sequence by extrapolating statistics for non- subsampled frames based on statistics generated for the coded subsampled frames within a corresponding identified region of homogeneity;
if the statistics for the video sequence do not meet a specified requirement, modifying the coding parameters for a next iteration of the coding process; and
coding the non-subsampled frames on a last iteration of the coding process to produce a complete coded video sequence.

55. The computer-readable medium of claim 54, wherein the method further comprises identifying regions of homogeneity within the video sequence on each intermediate iteration.

56. A non-transitory computer-readable medium encoded with instructions which, when executed by a computer, perform a method of coding a video sequence according to a two-stage iterative coding process, the method comprising:
subsampling frames from the video sequence;
iteratively coding the subsampled frames during a first stage of coding until an estimated bit rate of the video sequence is within a first tolerance range of a target bit rate;
iteratively coding all frames of the video sequence during a second stage of coding until the estimated bit rate of the video sequence is within a second tolerance range of the target bit rate; and
adjusting coding parameters after each iteration of the coding process.

57. The computer-readable medium of claim 56, wherein subsampling comprises selecting all of the reference frames of the video sequence.

58. The computer-readable medium of claim 56, wherein the method further comprises extrapolating statistics for non-subsampled frames based on statistics generated for coded subsampled frames after each iteration of the first stage of the coding process.

59. The computer-readable medium of claim 56, wherein iteratively coding all frames comprises iteratively coding all frames based on statistics gathered during a last iteration of the first stage of coding.

60. A non-transitory computer-readable medium encoded with instructions which, when executed by a computer, perform a method of coding a video sequence according to an iterative coding process, the method comprising:
subsampling frames of the video sequence on a first iteration based on an availability of initial statistics of the video sequence;
coding the subsampled frames according to default coding parameters;
gathering statistics on the video sequence based on the coded subsampled frames;
if the gathered statistics do not meet a specified requirement, modifying the coding parameters for a next iteration of the coding process;
removing a portion of the subsampled frames for the next iteration based on the gathered statistics; and
coding all frames on a last iteration of the coding process to produce a complete coded video sequence.

61. The computer-readable medium of claim 60, wherein subsampling comprises selecting all frames of the video sequence when the initial statistics are not available.

62. The computer-readable medium of claim 60, wherein gathering comprises extrapolating statistics for non-subsampled frames based on statistics generated for the coded subsampled frames.

63. The computer-readable medium of claim 60, wherein removing comprises removing the portion of the subsampled frames based on a local confidence measure of the gathered statistics.

64. The computer-readable medium of claim 63, wherein the local confidence measure is an indication of homogeneity within a neighborhood of frames.

65. The computer-readable medium of claim 60, wherein removing frames comprises removing frames sequentially based on a reference count of each frame.

* * * * *